(12) United States Patent
Lu

(10) Patent No.: US 11,505,123 B2
(45) Date of Patent: Nov. 22, 2022

(54) VEHICULAR CAMERA MONITORING SYSTEM WITH STEREOGRAPHIC DISPLAY

(71) Applicant: Magna Electronics Inc., Auburn Hills, MI (US)

(72) Inventor: Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 51 days.

(21) Appl. No.: 17/247,127

(22) Filed: Dec. 1, 2020

(65) Prior Publication Data

US 2021/0162926 A1 Jun. 3, 2021

Related U.S. Application Data

(60) Provisional application No. 62/942,305, filed on Dec. 2, 2019.

(51) Int. Cl.
*B60R 1/00* (2022.01)
*H04N 13/239* (2018.01)
(Continued)

(52) U.S. Cl.
CPC ............... *B60R 1/00* (2013.01); *G06T 7/70* (2017.01); *H04N 5/247* (2013.01); *H04N 5/2628* (2013.01); *H04N 13/156* (2018.05); *H04N 13/239* (2018.05); *H04N 13/302* (2018.05); *H04N 13/376* (2018.05); *H04N 13/383* (2018.05); *B60R 2300/105* (2013.01); *B60R 2300/107* (2013.01); *B60R 2300/20* (2013.01); *B60R 2300/303* (2013.01);
(Continued)

(58) Field of Classification Search
CPC ............... B60R 1/00; B60R 2300/105; B60R 2300/107; B60R 2300/20; B60R 2300/303; B60R 2300/8066; G06T 7/70; G06T 2207/30201; G06T 2207/30268; H04N 5/247; H04N 5/2628; H04N 13/156; H04N 13/239; H04N 13/302; H04N 13/376; H04N 13/383; H04N 5/2253; H04N 7/183; H04N 13/117; H04N 13/30
USPC .......................................................... 348/43
See application file for complete search history.

(56) References Cited

U.S. PATENT DOCUMENTS 4,546,551 A 10/1985 Franks
4,953,305 A 9/1990 Van Lente et al.
(Continued)

*Primary Examiner* — Susan E. Torgerson
(74) *Attorney, Agent, or Firm* — Honigman LLP

(57) ABSTRACT

A vehicular camera monitoring system includes a pair of rearward viewing cameras disposed at a vehicle with overlapping fields of view. A driver-monitoring camera is disposed at the vehicle. An ECU includes an image processor that processes image data captured by the driver-monitor camera and the rearward viewing cameras. A stereographic video display screen is disposed at the vehicle and viewable by the driver of the vehicle. Responsive to processing of image data captured by the driver-monitoring camera, the ECU determines location of each eye of the driver of the vehicle. Responsive to processing of image data captured by each of the rearward viewing cameras, the stereographic video display screen displays video images derived at least in part from image data captured by both rearward viewing cameras and provides depth perception to the driver of the vehicle viewing the displayed video images.

21 Claims, 3 Drawing Sheets

(51) Int. Cl.
  *H04N 5/247* (2006.01)
  *H04N 13/383* (2018.01)
  *G06T 7/70* (2017.01)
  *H04N 13/302* (2018.01)
  *H04N 13/156* (2018.01)
  *H04N 5/262* (2006.01)
  *H04N 13/376* (2018.01)
  *H04N 5/225* (2006.01)

(52) U.S. Cl.
  CPC .............. G06T 2207/30201 (2013.01); G06T 2207/30268 (2013.01); H04N 5/2253 (2013.01)

(56) References Cited

U.S. PATENT DOCUMENTS

| | | | |
|---|---|---|---|
| 5,530,240 A | 6/1996 | Larson et al. | |
| 5,550,677 A | 8/1996 | Schofield et al. | |
| 5,576,687 A | 11/1996 | Blank et al. | |
| 5,632,092 A | 5/1997 | Blank et al. | |
| 5,668,663 A | 9/1997 | Varaprasad et al. | |
| 5,670,935 A | 9/1997 | Schofield et al. | |
| 5,699,044 A | 12/1997 | Van Lente et al. | |
| 5,708,410 A | 1/1998 | Blank et al. | |
| 5,724,187 A | 3/1998 | Varaprasad et al. | |
| 5,737,226 A | 4/1998 | Olson et al. | |
| 5,802,727 A | 9/1998 | Blank et al. | |
| 5,878,370 A | 3/1999 | Olson | |
| 5,949,331 A | 9/1999 | Schofield et al. | |
| 6,087,953 A | 7/2000 | DeLine et al. | |
| 6,173,501 B1 | 1/2001 | Blank et al. | |
| 6,222,460 B1 | 4/2001 | DeLine et al. | |
| 6,329,925 B1 | 12/2001 | Skiver et al. | |
| 6,513,252 B1 | 2/2003 | Schierbeek et al. | |
| 6,642,851 B2 | 11/2003 | Deline et al. | |
| 6,690,268 B2 | 2/2004 | Schofield et al. | |
| 7,004,593 B2 | 2/2006 | Weller et al. | |
| 7,038,577 B2 | 5/2006 | Pawlicki et al. | |
| 7,184,190 B2 | 2/2007 | McCabe et al. | |
| 7,195,381 B2 | 3/2007 | Lynam et al. | |
| 7,249,860 B2 | 7/2007 | Kulas et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,308,341 B2 | 12/2007 | Schofield et al. | |
| 7,329,013 B2 | 2/2008 | Blank et al. | |
| 7,338,177 B2 | 3/2008 | Lynam | |
| 7,370,983 B2 | 5/2008 | DeWind et al. | |
| 7,446,650 B2 | 11/2008 | Scholfield et al. | |
| 7,581,859 B2 | 9/2009 | Lynam | |
| 7,626,749 B2 | 12/2009 | Baur et al. | |
| 7,720,580 B2 | 5/2010 | Higgins-Luthman | |
| 7,855,755 B2 | 12/2010 | Weller et al. | |
| 9,041,806 B2 | 5/2015 | Baur et al. | |
| 9,126,525 B2 | 9/2015 | Lynam et al. | |
| 9,264,672 B2 | 2/2016 | Lynam | |
| 9,280,202 B2 | 3/2016 | Gieseke et al. | |
| 9,405,120 B2 | 8/2016 | Graf et al. | |
| 9,596,387 B2 | 3/2017 | Achenbach et al. | |
| 9,598,016 B2 | 3/2017 | Blank et al. | |
| 9,701,258 B2 | 7/2017 | Tiryaki | |
| 9,762,880 B2 | 9/2017 | Pflug | |
| 9,834,153 B2 | 12/2017 | Gupta et al. | |
| 9,900,522 B2 | 2/2018 | Lu | |
| 10,017,114 B2 | 7/2018 | Bongwald | |
| 10,071,687 B2 | 9/2018 | Ihlenburg et al. | |
| 10,247,941 B2 | 4/2019 | Fursich | |
| 10,503,989 B2 | 12/2019 | Nishino | |
| 10,703,204 B2 | 7/2020 | Hassan et al. | |
| 2006/0050018 A1 | 3/2006 | Hutzel et al. | |
| 2006/0061008 A1 | 3/2006 | Karner et al. | |
| 2008/0304705 A1* | 12/2008 | Pomerleau | H04N 5/247 348/148 |
| 2012/0162427 A1 | 6/2012 | Lynam | |
| 2015/0009010 A1 | 1/2015 | Biemer | |
| 2015/0022664 A1 | 1/2015 | Pflug et al. | |
| 2015/0092042 A1 | 4/2015 | Fursich | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0049020 A1 | 2/2016 | Kuehnle et al. | |
| 2016/0137126 A1 | 5/2016 | Fursich et al. | |
| 2017/0153457 A1* | 6/2017 | Kunze | H04N 13/302 |
| 2017/0174128 A1 | 6/2017 | Hu et al. | |
| 2018/0134217 A1 | 5/2018 | Peterson et al. | |
| 2018/0191954 A1* | 7/2018 | Pan | H04N 13/128 |
| 2021/0155167 A1 | 5/2021 | Lynam et al. | |

* cited by examiner

VEHICULAR CAMERA MONITORING SYSTEM WITH STEREOGRAPHIC DISPLAY

CROSS REFERENCE TO RELATED APPLICATION

The present application claims the filing benefits of U.S. provisional application Ser. No. 62/942,305, filed Dec. 2, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera monitoring system for a vehicle that utilizes cameras to capture image data representative of images exterior of the vehicle, and provides a stereographic video display screen for displaying video images for viewing by the driver of the vehicle. The system includes a pair of rearward viewing cameras disposed at the vehicle, with each rearward viewing camera of the pair of rearward viewing cameras having a field of view at least rearward of the vehicle, and with the fields of view of the rearward viewing cameras overlapping. The rearward viewing cameras are mounted at the vehicle side by side one another with the principal axes of the fields of view of the rearward viewing cameras being spaced apart by a known distance. The system includes a driver-monitoring camera disposed at the vehicle and viewing a driver head portion or region of a driver of the vehicle. The rearward viewing cameras and the driver-monitoring camera capture image data, and an image processor of the control is operable to process image data captured by the driver-monitor camera and the rearward viewing cameras. The control, via processing at the control of image data captured by the driver-monitoring camera, determines location of each eye of the driver of the vehicle. Responsive to processing at the control of image data captured by each rearward viewing camera of the pair of rearward viewing cameras, the video display screen displays video images derived at least in part from image data captured by both rearward viewing cameras of the pair of rearward viewing cameras and provides depth perception to the driver of the vehicle viewing the displayed video images.

The stereographic video display screen provides depth perception by (i) projecting video images derived from image data captured by a left-side rearward viewing camera of the pair of rearward viewing cameras toward the left eye of the driver of the vehicle and (ii) projecting video images derived from image data captured by a right-side rearward viewing camera of the pair of rearward viewing cameras toward the right eye of the driver of the vehicle. The system may also provide for panning of the displayed video images to enhance the driver's view rearward (and/or sideward) of the vehicle when viewing the video display screen. For example, the system may pan or adjust the displayed video images at the stereographic video display screen responsive to determining, via image processing at the control of image data captured by the driver-monitoring camera, that the driver's head (and eyes) has changed position, in order to accommodate the driver's change in viewing angle toward the stereographic video display screen.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system and/or camera monitoring system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
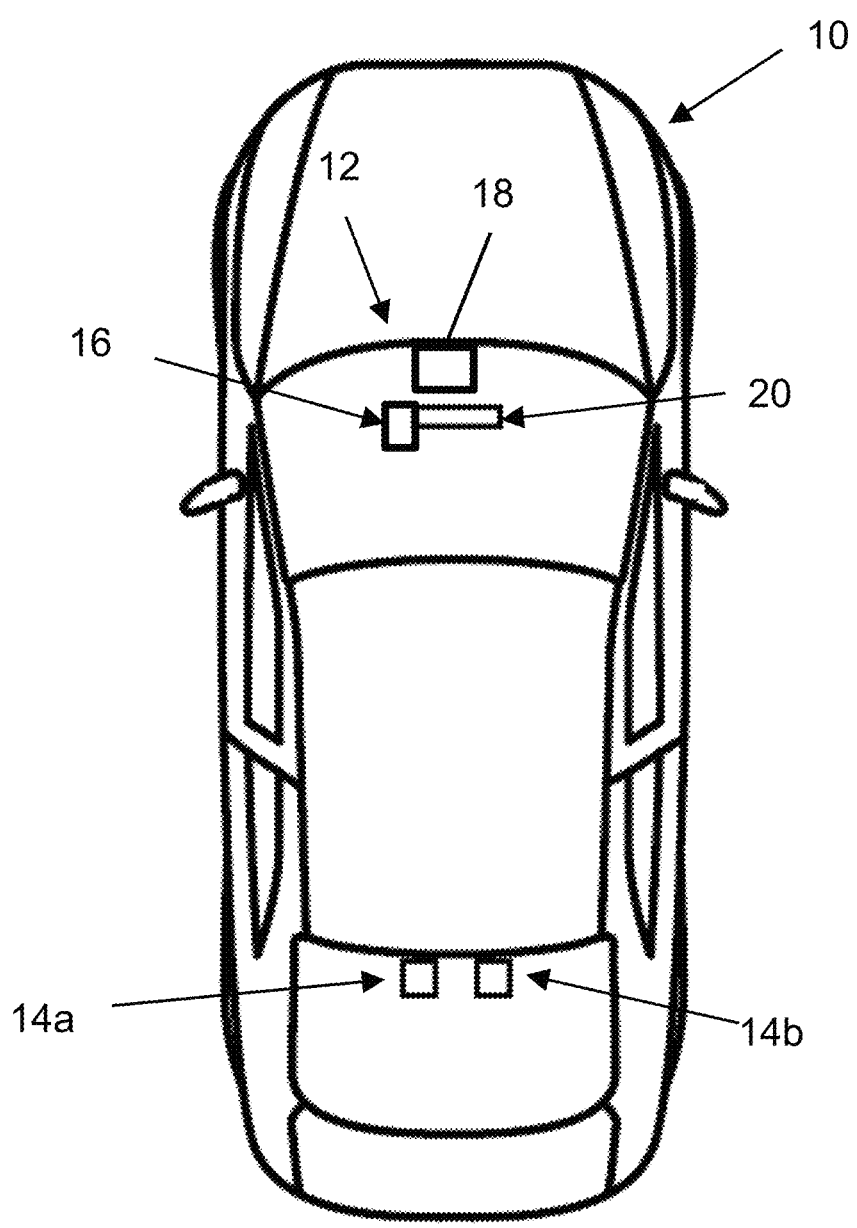
FIG. 1 is a plan view of a vehicle with a camera monitoring system that incorporates cameras and a display in accordance with the present invention.

Referring now to the drawings and the illustrative embodiments depicted therein, a vehicle 10 includes a vision system or camera monitoring system 12 that includes two exterior viewing imaging sensors or cameras, such as two rearward viewing imaging sensors or cameras 14a, 14b (and the system may optionally include multiple exterior viewing imaging sensors or cameras, such as a forward viewing camera at the front (or at the windshield) of the vehicle 10, and sideward/rearward viewing cameras at respective sides of the vehicle 10), which capture images exterior of the vehicle 10, with each camera having a lens for focusing images at or onto an imaging array or imaging plane or imager of the camera (FIG. 1). The vision system or camera monitoring system 12 also includes an in-cabin camera or driver monitoring camera 16 disposed in the vehicle 10 and viewing the driver head region of the driver of the vehicle 10. The vision system 12 includes a control or electronic control unit (ECU) 18 having a data processor and associated circuitry and software, with the data processor being operable to process image data captured by the rearward viewing cameras 14a, 14b and to generate an output to a display device 20 that displays video images derived from image data captured by the rearward viewing cameras 14a, 14b. The camera monitoring system 12, responsive to processing of image data captured by the driver monitoring camera 16, determines a driver head movement or change in gaze direction (when the driver is viewing the display screen of the display device 20), and adjusts the displayed video images according to the determined change in driver's gaze direction.

A camera monitoring system (CMS), if using one rearward viewing camera and one display, lacks depth perception. The camera monitoring system 12, by using two rearward viewing cameras 14a, 14b that have similar and overlapping fields of view, and that point or view in the same direction and that are separated by a known distance (such as five inches or less, such as three inches or less or any suitable distance), can provide or achieve depth perception in the displayed video images. The display device 20 has stereographic characteristics (i.e., it can display or project two images at the same time, with the two images projected toward different target locations, such as the individual eyes of the viewer), and the video images derived from image data captured by the left-side camera 14a are projected toward the driver's left eye, and the video images derived from image data captured by the right-side camera 14b are projected toward the driver's right eye.

Figure 2:
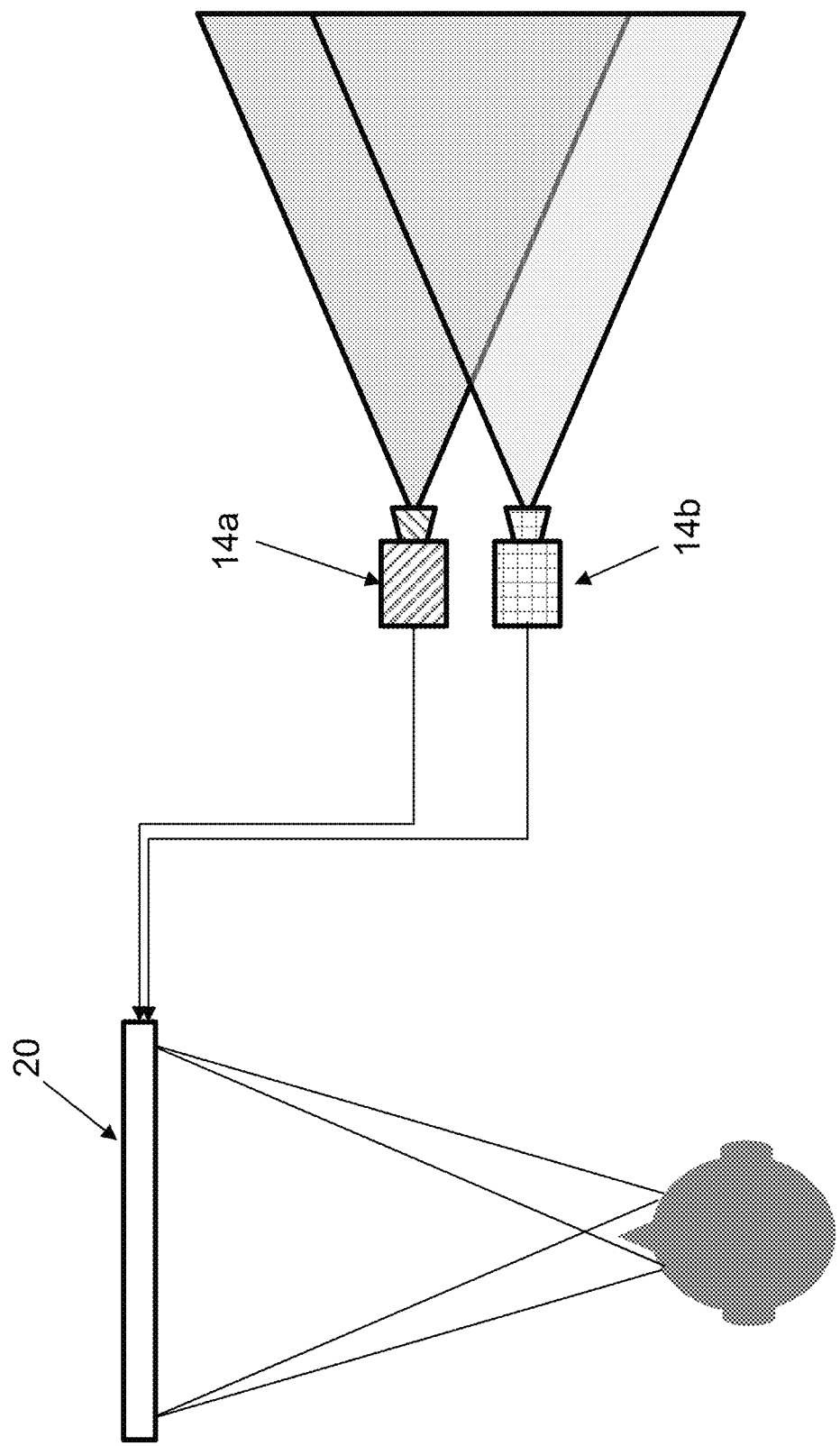
FIG. 2 is a schematic of the camera monitoring system.
Figure 3:
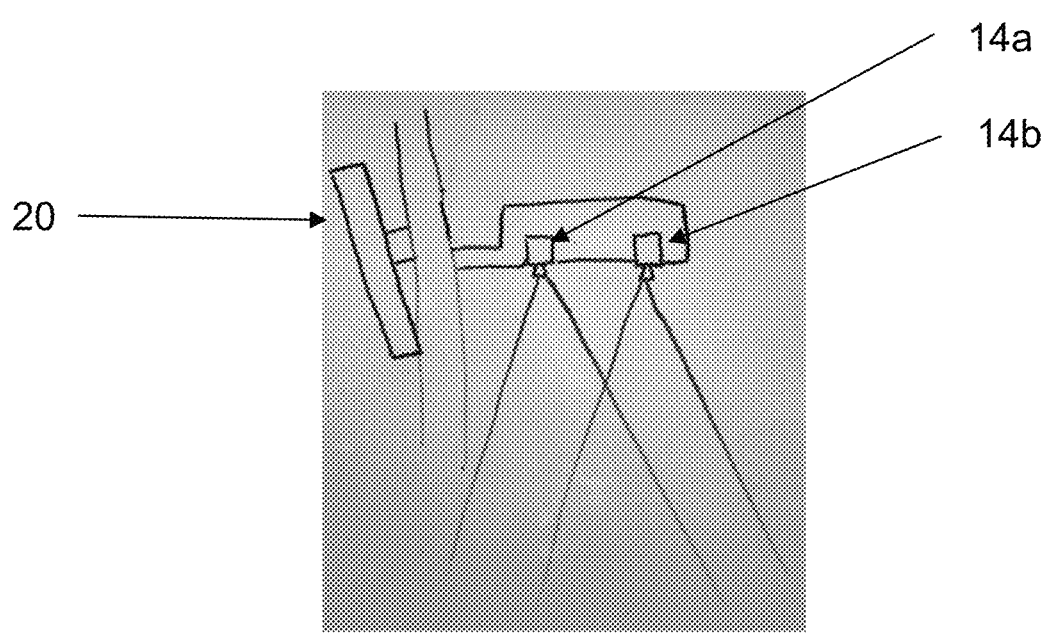
FIG. 3 is a schematic of another camera monitoring system, shown with the two cameras at a side of the vehicle.

As shown in FIGS. 2 and 3, the cameras 14a, 14b are disposed at the vehicle 10 so as to view in generally the same direction, with overlapping fields of view. The separation distance or gap between the principal axes of the fields of view of the cameras 14a, 14b is known. The cameras 14a, 14b are arranged at the vehicle 10 so as to have the principal axes parallel to one another. The cameras may be part of or incorporated in a single camera module that is mounted at the vehicle 10.

In the illustrated embodiment of FIG. 1, the exterior viewing cameras 14a, 14b of the camera monitoring system 12 are mounted at a rear window region or portion of the vehicle 10 so as to view rearward of the vehicle 10. The cameras 14a, 14b thus may be generally centrally located (such as both cameras disposed at a central region that includes a region through which a longitudinal center-line of the vehicle passes) and disposed at opposite sides of the longitudinal center-line axis of the vehicle 10. Optionally, the camera pair can be mounted elsewhere at the vehicle 10, such as at a respective one of the exterior rearview and sideview mirrors or such as at a rear portion of the vehicle 10, facing rearward. The camera monitoring system 12 may utilize aspects of the systems described in U.S. Pat. No. 10,503,989 and/or U.S. Publication No. US-2018-0134217 and/or U.S. patent application Ser. No. 16/949,976, filed Nov. 23, 2020, which are all hereby incorporated herein by reference in their entireties.

Optionally, image data captured by each of the pairs of cameras may be used for displaying video images at a respective display inside the vehicle 10 at suitable locations. For example, a driver-side display screen may be disposed at or near the driver-side of the interior cabin of the vehicle 10 (such as at or by the driver-side A-pillar of the vehicle) for displaying video images derived from image data captured by a pair of cameras in the driver-side exterior rearview mirror assembly, and a passenger-side display screen may be disposed at or near the passenger-side of the interior cabin of the vehicle 10 (or to the right of the center region of the interior cabin of the vehicle) for displaying video images derived from image data captured by a pair of cameras in the passenger-side exterior rearview mirror assembly, while a center display screen may be disposed at or near a center region of the interior cabin of the vehicle (such as at the center stack or such as at the interior rearview mirror assembly) for displaying video images derived from image data captured by a pair of cameras generally centrally located at a rearward portion of the vehicle 10 and viewing rearward of the vehicle 10. As shown in FIG. 3, the cameras 14a, 14b may be at an exterior side portion of the vehicle 10 (such as at or in or replacing the respective exterior side rearview mirror of the vehicle 10), and the display screen 20 may be located inside the cabin of the vehicle 10 at or near the side portion where the cameras are located (e.g., the cameras may be disposed at a passenger-side mirror structure and the display screen may be disposed at the passenger-side A-pillar of the vehicle 10).

The camera monitoring system 12 determines the location of the driver's eyes and the driver's head position via processing image data captured by the driver monitoring camera 16. With the respective displayed video images (derived from image data captured by a respective one of the cameras 14a, 14b) being projected toward a respective eye of the driver, the camera monitoring system 12 provides depth perception via the stereographic display screen.

The camera monitoring system 12 may also provide the driver with the ability to alter the images displayed on the display screen 20 in a manner similar to how a driver's rearward view is altered when the driver moves his or her head while viewing a rearview mirror of the vehicle. Thus, based on the determined driver's head and eye position (as determined via processing of image data captured by the driver monitoring camera 16), the video images displayed at the display screen 20 may be panned to mimic the driver's perception when the driver is viewing a typical interior mirror. For example, when the driver moves his or her head to the left, the camera monitoring system 12 may pan the images to the right (i.e., the display screen 20 may display or project video images of the scene to the right of a nominal or centered region of the cameras' fields of view) to mimic how the view would change if the driver were viewing a typical mirror when such a head position change occurs.

The displayed video images thus may be representative of a centered portion of the image data captured by the cameras 14a, 14b (such as of a center block or two-dimensional array of the overall two-dimensional array of photosensors of each camera), with side sub-regions and optionally upper and lower sub-regions of photosensors around the center block or array), and then, when the camera monitoring system 12 determines that the driver's head changes position (optionally only when the camera monitoring system 12 also determines that the driver is viewing the display screen 20), the camera monitoring system 12 displays video images at the display screen 20 representative of part of the center block or array of photosensors and part or all (depending on how far the driver's head moves) of the appropriate or respective side (or upper/lower) region of the overall array of photosensors. Thus, the camera monitoring system 12 allows for adjustment of the displayed video images in the sideward and optionally upward and/or downward directions responsive to the driver looking at the display screen 20 from the different angles or locations.

The ECU 18, responsive to processing of image data captured by the cameras 14a, 14b, may detect or determine presence of objects or the like and/or the camera monitoring system 12 provides displayed video images at the display device 20 for viewing by the driver of the vehicle 10 (although shown in FIG. 1 as being part of or incorporated in or at an interior rearview mirror assembly or center console of the vehicle, the control 18 and/or the display device 20 may be disposed elsewhere at or in the vehicle 10). The data transfer or signal communication from the cameras 14a, 14b to the ECU 18 may comprise any suitable data or communication link, such as a vehicle network bus or the like of the equipped vehicle 10.

The camera monitoring system 12 includes an image processor at the ECU 18 operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the camera monitoring system 12 may generate an alert to the driver of the vehicle 10 and/or may generate an overlay at the displayed image to highlight or enhance display of the detected object or vehicle, in order to enhance the driver's awareness of the detected object or vehicle or hazardous condition during a driving maneuver of the equipped vehicle 10.

The vehicle 10 may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

The cameras 14a, 14b and control 18 and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454, 8,451,107, 8,446,470, 9,126,525, 9,041,806, 10,793,067, and/or 6,824,281, and/or U.S. Publication Nos. US 2010-0020170 and/or US-2009-0244361, which are all hereby incorporated herein by reference in their entireties.

The interior camera 16 and driver monitoring system 12 may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 9,405,120, 10,703,204, 10,247,941, 10,017,114, 9,701,258, and/or 9,280,202 and/or U.S. Publication Nos. US-2016-0137126; US-2015-0352953; US-2015-0296135; US-2015-0294169; US-2015-0092042; US-2015-0022664; and/or US-2015-0009010, which are hereby incorporated herein by reference in their entireties.

Optionally, the video display device 20 may utilize aspects of the video display devices and systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252. 9,598,016, 9,264,672 and/or 6,642,851, and/or U.S. Publication Nos. US-2006-0050018 and/or US-2006-0061008, which are all hereby incorporated herein by reference in their entireties.

Optionally, the vision system (utilizing a forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,126,525 and/or 9,041,806, and/or U.S. Publication Nos. US-2015-0022664 and/or US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera monitoring system comprising:
   a pair of rearward viewing cameras disposed at a vehicle equipped with the vehicular camera monitoring system, each rearward viewing camera of the pair of rearward viewing cameras having a field of view at least rearward of the vehicle, and wherein the fields of view of the rearward viewing cameras overlap;
   wherein the rearward viewing cameras of the pair of rearward viewing cameras are mounted at the vehicle side-by-side one another with respective principal axes of the fields of view of the pair of rearward viewing cameras being spaced apart;
   a driver-monitoring camera disposed at the vehicle and viewing a driver head portion of a driver of the vehicle;
   the rearward viewing cameras and the driver-monitoring camera capturing image data;
   an electronic control unit (ECU) having circuitry, wherein the circuitry of the ECU comprises an image processor operable to process image data captured by the driver-monitor camera and the rearward viewing cameras;
   a stereographic video display screen disposed at an interior cabin of the vehicle and viewable by the driver of the vehicle;
   wherein, responsive to processing at the ECU of image data captured by the driver-monitoring camera, the ECU determines location of each eye of the driver of the vehicle;
   wherein, responsive to the determined respective location of each eye of the driver of the vehicle, and responsive to processing at the ECU of image data captured by each rearward viewing camera of the pair of rearward viewing cameras, the stereographic video display screen displays video images derived at least in part from image data captured by both rearward viewing cameras of the pair of rearward viewing cameras and provides depth perception to the driver of the vehicle viewing the displayed video images;

wherein the displayed video images are representative of a first portion of the fields of view of the pair of rearward viewing cameras; and wherein, responsive to determining, via image processing at the ECU of image data captured by the driver-monitoring camera, that the driver's head has changed position, the stereographic video display screen displays adjusted video images representative of a second portion of the fields of view of the pair of rearward viewing cameras different from the first portion.

2. The vehicular camera monitoring system of claim 1, wherein the stereographic video display screen (i) projects video images derived from image data captured by a left-side rearward viewing camera of the pair of rearward viewing cameras toward the left eye of the driver of the vehicle and (ii) projects video images derived from image data captured by a right-side rearward viewing camera of the pair of rearward viewing cameras toward the right eye of the driver of the vehicle.

3. The vehicular camera monitoring system of claim 1, wherein, responsive to determining, via image processing at the ECU of image data captured by the driver-monitoring camera, that the driver's head has changed position, the displayed video images at the stereographic video display screen are panned toward the adjusted video images to accommodate the driver's change in viewing angle toward the stereographic video display screen.

4. The vehicular camera monitoring system of claim 1, wherein the rearward viewing cameras of the pair of rearward viewing cameras are mounted at the vehicle with the respective principal axes of the fields of view of the pair of rearward viewing cameras being parallel to one another.

5. The vehicular camera monitoring system of claim 1, wherein the pair of rearward viewing cameras are disposed at a rear portion of the vehicle.

6. The vehicular camera monitoring system of claim 1, wherein the rearward viewing cameras are disposed at opposite sides of a longitudinal center-line axis of the vehicle.

7. The vehicular camera monitoring system of claim 1, wherein the rearward viewing cameras are spaced apart by a distance of less than five inches.

8. The vehicular camera monitoring system of claim 1, wherein the rearward viewing cameras are disposed at a driver-side portion of the vehicle so as to view rearward and sideward at the driver side of the vehicle.

9. The vehicular camera monitoring system of claim 8, wherein the rearward viewing cameras are disposed at a driver-side exterior mirror assembly disposed at the driver-side portion of the vehicle.

10. The vehicular camera monitoring system of claim 1, wherein the rearward viewing cameras are disposed at a passenger-side portion of the vehicle so as to view rearward and sideward at the passenger side of the vehicle.

11. The vehicular camera monitoring system of claim 10, wherein the rearward viewing cameras are disposed at a passenger-side exterior mirror assembly disposed at the passenger-side portion of the vehicle.

12. A vehicular camera monitoring system comprising:

a pair of rearward viewing cameras disposed at a vehicle equipped with the vehicular camera monitoring system, each rearward viewing camera of the pair of rearward viewing cameras having a field of view at least rearward of the vehicle, and wherein the fields of view of the rearward viewing cameras overlap;

wherein the rearward viewing cameras of the pair of rearward viewing cameras are mounted at the vehicle side-by-side one another with respective principal axes of the fields of view of the pair of rearward viewing cameras being spaced apart and parallel to one another;

wherein the rearward viewing cameras are spaced apart by a distance of less than five inches;

a driver-monitoring camera disposed at the vehicle and viewing a driver head portion of a driver of the vehicle;

the rearward viewing cameras and the driver-monitoring camera capturing image data;

an electronic control unit (ECU) having circuitry, wherein the circuitry of the ECU comprises an image processor operable to process image data captured by the driver-monitor camera and the rearward viewing cameras;

a stereographic video display screen disposed at an interior cabin of the vehicle and viewable by the driver of the vehicle;

wherein, responsive to processing at the ECU of image data captured by the driver-monitoring camera, the ECU determines location of each eye of the driver of the vehicle;

wherein, responsive to the determined respective location of each eye of the driver of the vehicle, and responsive to processing at the ECU of image data captured by each rearward viewing camera of the pair of rearward viewing cameras, the stereographic video display screen (i) projects video images derived from image data captured by a left-side rearward viewing camera of the pair of rearward viewing cameras toward the left eye of the driver of the vehicle and (ii) projects video images derived from image data captured by a right-side rearward viewing camera of the pair of rearward viewing cameras toward the right eye of the driver of the vehicle;

wherein the projected video images are representative of a first portion of the fields of view of the pair of rearward viewing cameras; and wherein, responsive to determining, via image processing at the ECU of image data captured by the driver-monitoring camera, that the driver's head has changed position, the stereographic video display screen projects adjusted video images representative of a second portion of the fields of view of the pair of rearward viewing cameras different from the first portion.

13. The vehicular camera monitoring system of claim 12, wherein, responsive to determining, via image processing at the ECU of image data captured by the driver-monitoring camera, that the driver's head has changed position, the displayed video images at the stereographic video display screen are panned toward the adjusted video images to accommodate the driver's change in viewing angle toward the stereographic video display screen.

14. The vehicular camera monitoring system of claim 12, wherein the rearward viewing cameras are disposed at opposite sides of a longitudinal center-line axis of the vehicle.

15. The vehicular camera monitoring system of claim 12, wherein the rearward viewing cameras are disposed at a driver-side portion of the vehicle so as to view rearward and sideward at the driver side of the vehicle.

16. The vehicular camera monitoring system of claim 15, wherein the rearward viewing cameras are disposed at a driver-side exterior mirror assembly disposed at the driver-side portion of the vehicle.

17. The vehicular camera monitoring system of claim 12, wherein the rearward viewing cameras are disposed at a passenger-side portion of the vehicle so as to view rearward and sideward at the passenger side of the vehicle.

18. The vehicular camera monitoring system of claim 17, wherein the rearward viewing cameras are disposed at a passenger-side exterior mirror assembly disposed at the passenger-side portion of the vehicle.

19. A vehicular camera monitoring system comprising:
a pair of rearward viewing cameras disposed at a vehicle equipped with the vehicular camera monitoring system, each rearward viewing camera of the pair of rearward viewing cameras having a field of view at least rearward of the vehicle, and wherein the fields of view of the rearward viewing cameras overlap;
wherein the rearward viewing cameras of the pair of rearward viewing cameras are mounted at the vehicle side-by-side one another with respective principal axes of the fields of view of the pair of rearward viewing cameras being spaced apart and parallel to one another;
wherein the pair of rearward viewing cameras are disposed at a rear portion of the vehicle;
wherein the rearward viewing cameras are disposed at opposite sides of a longitudinal center-line axis of the vehicle;
wherein the rearward viewing cameras are laterally spaced apart by a distance of less than five inches;
a driver-monitoring camera disposed at the vehicle and viewing a driver head portion of a driver of the vehicle;
the rearward viewing cameras and the driver-monitoring camera capturing image data;
an electronic control unit (ECU) having circuitry, wherein the circuitry of the ECU comprises an image processor operable to process image data captured by the driver-monitor camera and the rearward viewing cameras;
a stereographic video display screen disposed at an interior cabin of the vehicle and viewable by the driver of the vehicle;
wherein, responsive to processing at the ECU of image data captured by the driver-monitoring camera, the ECU determines location of each eye of the driver of the vehicle;
wherein, responsive to the determined respective location of each eye of the driver of the vehicle, and responsive to processing at the ECU of image data captured by each rearward viewing camera of the pair of rearward viewing cameras, the stereographic video display screen displays video images derived at least in part from image data captured by both rearward viewing cameras of the pair of rearward viewing cameras and provides depth perception to the driver of the vehicle viewing the displayed video images;
wherein the displayed video images are representative of a first portion of the fields of view of the pair of rearward viewing cameras; and
wherein, responsive to determining, via image processing at the ECU of image data captured by the driver-monitoring camera, that the driver's head has changed position, the stereographic video display screen displays adjusted video images representative of a second portion of the fields of view of the pair of rearward viewing cameras different from the first portion.

20. The vehicular camera monitoring system of claim 19, wherein the stereographic video display screen (i) projects video images derived from image data captured by a left-side rearward viewing camera of the pair of rearward viewing cameras toward the left eye of the driver of the vehicle and (ii) projects video images derived from image data captured by a right-side rearward viewing camera of the pair of rearward viewing cameras toward the right eye of the driver of the vehicle.

21. The vehicular camera monitoring system of claim 19, wherein, responsive to determining, via image processing at the ECU of image data captured by the driver-monitoring camera, that the driver's head has changed position, the displayed video images at the stereographic video display screen are panned toward the adjusted video images to accommodate the driver's change in viewing angle toward the stereographic video display screen.

* * * * *